(12) United States Patent
Cabiri et al.

(10) Patent No.: US 12,465,339 B2
(45) Date of Patent: Nov. 11, 2025

(54) STEERING TOOL WITH CONTROLLED DISTAL FLEXIBILITY

(71) Applicants: Oz Cabiri, Hod HaSharon (IL); Oded Meiri, Ram-On (IL)

(72) Inventors: Oz Cabiri, Hod HaSharon (IL); Oded Meiri, Ram-On (IL)

(73) Assignee: Bendit Technologies Ltd., Petach Tikva (IL)

( * ) Notice: Subject to any disclaimer, the term of this patent is extended or adjusted under 35 U.S.C. 154(b) by 3066 days.

(21) Appl. No.: 15/057,329

(22) Filed: Mar. 1, 2016

(65) Prior Publication Data

US 2017/0252025 A1    Sep. 7, 2017

(51) Int. Cl.
*A61M 25/01*    (2006.01)
*A61B 17/00*    (2006.01)

(52) U.S. Cl.
CPC ... *A61B 17/00234* (2013.01); *A61M 25/0136* (2013.01); *A61M 25/0147* (2013.01); *A61B 2017/00327* (2013.01); *A61M 2025/015* (2013.01)

(58) Field of Classification Search
CPC .............................. A61M 25/013–0138; A61M 2025/0004–0006; A61M 25/0133–0147; A61M 25/0136; A61M 2025/0161; A61M 2025/015; A61M 25/0102; A61M 25/0105; A61M 25/09041
See application file for complete search history.

(56) References Cited

U.S. PATENT DOCUMENTS

| | | | | |
|---|---|---|---|---|
| 5,190,050 A | * | 3/1993 | Nitzsche | A61M 25/0136 600/585 |
| 5,322,064 A | * | 6/1994 | Lundquist | A61B 18/1492 600/381 |
| 5,545,200 A | * | 8/1996 | West | A61B 18/1492 606/29 |
| 5,752,915 A | * | 5/1998 | Neubauer | A61N 1/056 600/374 |
| 6,030,349 A | * | 2/2000 | Wilson | A61M 25/09041 600/434 |

(Continued)

FOREIGN PATENT DOCUMENTS

| | | |
|---|---|---|
| WO | 94/11057 | 5/1994 |
| WO | 2015/095475 | 6/2015 |

*Primary Examiner* — Jennifer Robertson
*Assistant Examiner* — H.Q. Nguyen
(74) *Attorney, Agent, or Firm* — Dekel Patent Ltd.; David Klein

(57) ABSTRACT

A steering tool includes an internal tube disposed inside an external tube. The internal and external tubes are arranged for longitudinal axial movement relative to one another. A distal end of the internal tube is fixedly joined to a distal end of the external tube. A tube manipulator can cause relative axial movement and distal bending of the internal and external tubes. A locking mechanism can switch between a locked position in which the internal and external tubes are locked at a particular longitudinal axial position relative to one another, and an unlocked position in which there is uninhibited free movement of the internal and external tubes relative to one another. The locking mechanism also includes an intermediate locked position in which there is partially inhibited movement of the internal and external tubes relative to one another.

6 Claims, 4 Drawing Sheets

(56) References Cited

U.S. PATENT DOCUMENTS

| | | | |
|---|---|---|---|
| 6,533,772 B1* | 3/2003 | Sherts | A61M 25/0113 |
| | | | 279/42 |
| 6,551,302 B1* | 4/2003 | Rosinko | A61M 25/0084 |
| | | | 604/22 |
| 6,554,794 B1* | 4/2003 | Mueller | A61B 17/3478 |
| | | | 604/528 |
| 9,375,553 B2* | 6/2016 | Chrisman | A61M 25/09041 |
| 2009/0137953 A1* | 5/2009 | Fischer | A61M 25/0136 |
| | | | 604/95.04 |
| 2010/0280449 A1* | 11/2010 | Alvarez | A61B 34/30 |
| | | | 604/95.04 |
| 2010/0331776 A1* | 12/2010 | Salahieh | A61M 25/0138 |
| | | | 604/95.04 |
| 2012/0253131 A1* | 10/2012 | Malkowski | A61B 17/3421 |
| | | | 600/201 |
| 2014/0066948 A1* | 3/2014 | Soutorine | A61B 17/50 |
| | | | 606/127 |
| 2014/0257459 A1* | 9/2014 | Masakazu | A61B 17/00 |
| | | | 623/1.11 |
| 2014/0350568 A1* | 11/2014 | Shekalim | A61B 17/22 |
| | | | 606/127 |
| 2014/0371789 A1* | 12/2014 | Hariton | A61B 17/00234 |
| | | | 606/215 |
| 2015/0133779 A1* | 5/2015 | Yurek | A61B 8/481 |
| | | | 600/435 |
| 2015/0165162 A1 | 6/2015 | Barenboym | |
| 2015/0231371 A1 | 8/2015 | Rollins | |
| 2015/0297246 A1* | 10/2015 | Patel | A61B 17/1671 |
| | | | 606/79 |
| 2018/0242962 A1* | 8/2018 | Walen | A61B 17/1631 |

* cited by examiner

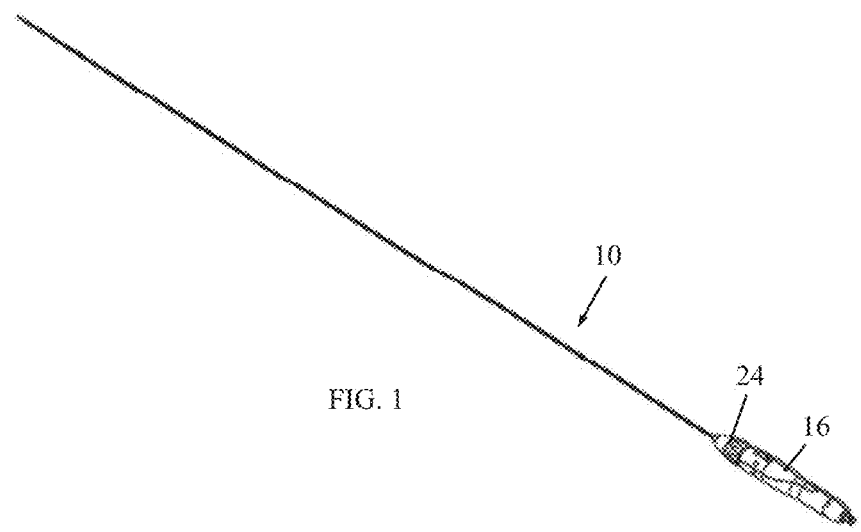
FIG. 1
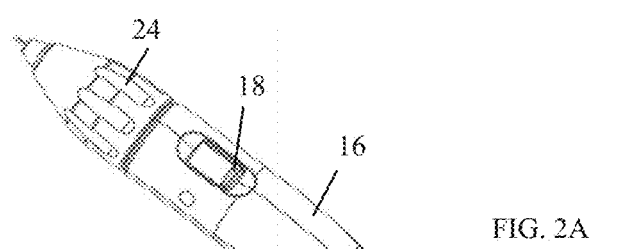
FIG. 2A
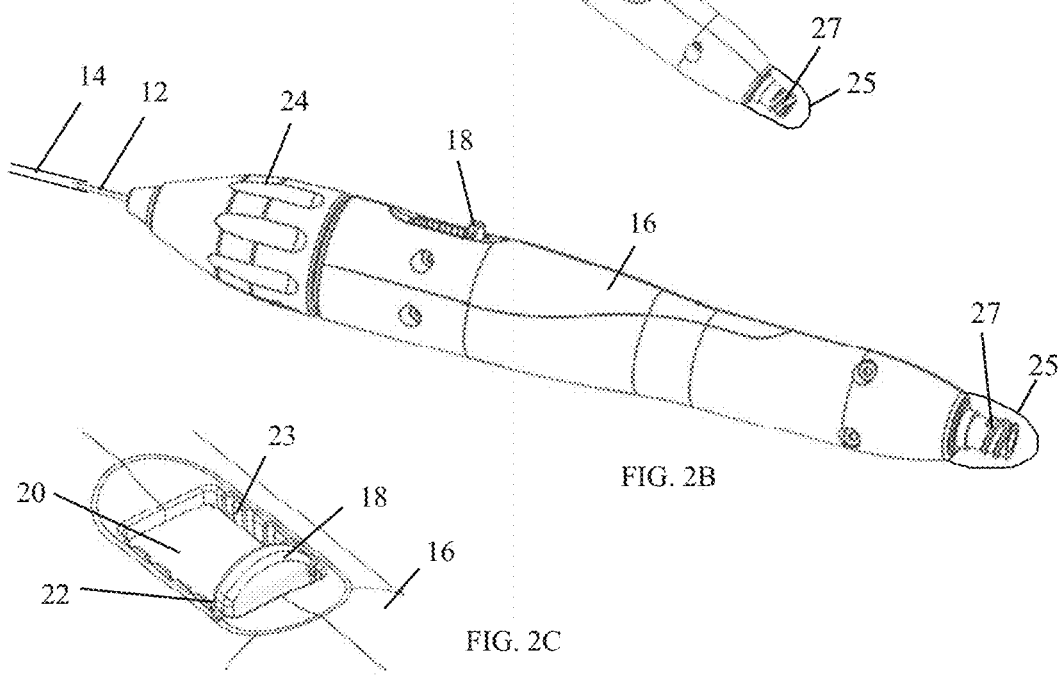
FIG. 2B
FIG. 2C

STEERING TOOL WITH CONTROLLED DISTAL FLEXIBILITY

FIELD OF THE INVENTION

The present invention generally relates to a steering tool for steering medical devices through body lumens, and particularly to a steering tool with controlled flexibility of the distal portion of the tool.

BACKGROUND OF THE INVENTION

PCT Patent Application PCT/US2014/071075, to the present inventor, describes a steering tool for steering medical devices through body lumens. The steering tool has an internal tube disposed inside an external tube. The internal and external tubes are arranged for longitudinal axial movement relative to one another. The distal end of the internal tube is fixedly joined to the distal end of the external tube. One or both of the internal and external tubes is slotted near the distal end thereof. The longitudinal axial movement causes bending of the distal ends of the tubes. One or both of the internal and external tubes are slotted near the distal ends thereof. The steering tool provides a distal tip which combines steerability, flexibility and torqueability. The tool eliminates the need for pull/push wires.

The steering tool includes a manipulation handle and a tube manipulator, such as a linear slider. The tube manipulator causes relative axial movement of the internal and external tubes. For example, moving tube manipulator distally causes bending of the distal tip of the internal and external tubes. The tube manipulator may be locked in place and released when desired from the locked position and relocked in place. In the unlocked position, there is free movement during insertion of the steering tool into the body lumen, so that both tubes can move freely and allow the steering tool to bend in accordance with the shape of the body lumen (such as any kind of curved path). After reaching the desired destination in the body lumen, the handle is locked for no more bending. Thus, the steering tool can be used very easily as a guide wire for guiding catheters and other devices.

SUMMARY OF THE INVENTION

The present invention seeks to provide further improvements to the steering tool for steering medical devices through body lumens, as is described more in detail hereinbelow.

There is thus provided in accordance with an embodiment of the present invention a steering tool including an internal tube disposed inside an external tube, the internal and external tubes being arranged for longitudinal axial movement relative to one another, wherein a distal end of the internal tube is fixedly joined to a distal end of the external tube, a tube manipulator operative to cause relative axial movement of the internal and external tubes and bending of a distal portion of at least one of the internal and external tubes, a locking mechanism operative to switch between a locked position and an unlocked position, wherein in the locked position the internal and external tubes are locked at a particular longitudinal axial position relative to one another, and in the unlocked position there is uninhibited free movement of the internal and external tubes relative to one another, and wherein the locking mechanism includes an adjustment assembly operative to create an intermediate locked position in which there is partially inhibited movement of the internal and external tubes relative to one another.

In accordance with an embodiment of the present invention the adjustment assembly includes a biasing device operative to apply a biasing force on at least one of the internal and external tubes that at least partially inhibits movement of the internal and external tubes relative to one another.

In accordance with an embodiment of the present invention a control knob is operatively connected to the adjustment assembly for switching between the locked, intermediate locked and unlocked positions. The control knob may be lockable at different positions.

In accordance with an embodiment of the present invention the control knob is connected to a stopper which is movable towards an abutment element mounted on at least one of the tubes.

In accordance with an embodiment of the present invention, in the locked position, the biasing device applies a first biasing force against the abutment element sufficient to completely inhibit movement of the internal and external tubes relative to one another, and in the intermediate locked position, the biasing device applies a second biasing force against the abutment element to partially inhibit movement of the internal and external tubes relative to one another.

In the locked position, distal portions of the internal and external tubes are in a fixed deformed orientation, and in the intermediate locked, the distal portions of the internal and external tubes are in a changeable deformed orientation.

BRIEF DESCRIPTION OF THE DRAWINGS

The present invention will be understood and appreciated more fully from the following detailed description taken in conjunction with the drawings in which:

FIG. 1 is a simplified illustration of a steering tool, in accordance with a non-limiting embodiment of the present invention;

FIGS. 2A and 2B are simplified illustrations of a handle of the steering tool, in accordance with a non-limiting embodiment of the present invention, showing a control knob for locking the tubes of the steering tool completely or partially or not at all (i.e., unlocked so the tubes can move freely);

FIG. 2C is an enlarged illustration of the control knob;

DETAILED DESCRIPTION OF EMBODIMENTS

Figure 3A:
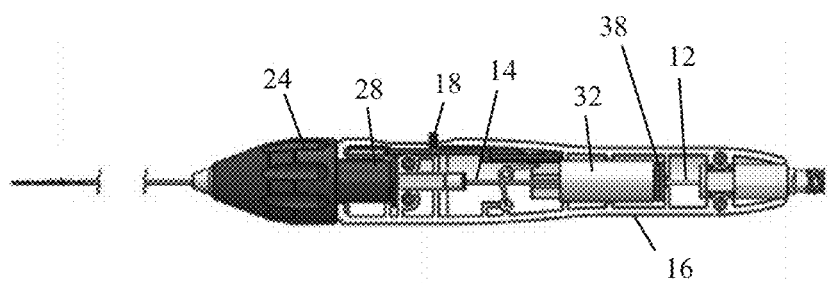
FIG. 3A is a simplified cutaway illustration of the steering tool, showing the internal mechanism.

Reference is now made to FIGS. 1-2B, which illustrate a steering tool 10, in accordance with a non-limiting embodiment of the present invention.

Steering tool 10 includes an internal tube 12 disposed inside an external tube 14 (seen in FIG. 2B). A distal end of internal tube 12 is fixedly joined to a distal end of external tube 14. The term "joined" encompasses any method for attaching the materials of the tubes together, such as but not limited to, welding, ultrasonic welding, thermal bonding, adhesive bonding, molding, and others. The internal and external tubes 12 and 14 are arranged for longitudinal axial movement relative to one another (except for their distal ends which are joined together).

Steering tool 10 includes a handle 16 that has a control knob 18 for locking the tubes 12 and 14 of steering tool 10 completely or partially or not at all (i.e., unlocked so the tubes can move freely), as is described further below. Control knob 18 may be a slidable knob that slides in a channel 20 and which has teeth 22 that can engage ridges 23 formed in the sides of channel 20 (FIG. 2C). In this manner, control knob 18 may be lockable at different positions. In alternative embodiments, control knob 18 may be a rotating element, non-limiting examples of which are given below. The term "knob" encompasses any manipulative element, such us but not limited to, a knob, button, roller, switch and the like. For example, although the embodiment below is described with reference to a mechanical knob, alternatively, the invention may be carried out with an electronic biasing system, in which case the control knob may be an electrical switch, such as a button or touchpad.

Handle 16 may also include a tube manipulator 24. Rotation of tube manipulator 24 causes longitudinal axial movement of one of the internal and external tubes 12 and 14 relative to one another so as to cause the distal portions of the tubes to bend or curve or otherwise deform, as is now described with reference to FIG. 3C (some parts also indicated in FIG. 3A).

The tube manipulator 24 includes an internal spindle 26 which is in threaded engagement with a tube holder 28 secured to outer tube 14. Rotation of tube manipulator 24 together with internal spindle 26 about a longitudinal axis 30 of the device causes tube holder 28 together with outer tube 14 to move axially along longitudinal axis 30 (the threaded connection converts the rotational movement to axial movement as in the advancement of a screw). The longitudinal axial movement of external tube 14 relative to internal tube 12 causes the distal portions of the tubes to bend or curve or otherwise deform. The tube manipulator 24 could alternatively be connected to the internal tube 12 instead of the outer tube 14 and cause longitudinal axial movement of internal tube 12 relative to external tube 14 to cause the distal portions of the tubes to bend or curve or otherwise deform.

The tube manipulator 24 is used to bend, curve or otherwise deform the distal portions of the tubes, Thus, tube manipulator 24 controls steering and tip location in one plane at a time. Optionally, steering tool 10 may include another manipulator, called a phase shift manipulator 25, which may be a knob in threaded engagement with a threaded shaft 27 connected to internal tube 12. One or both of the internal and outer tubes may be formed with slots. The slots may be phase-shifted with respect to one another (i.e., the slots on one tube may be phase-shifted with respect to one another and/or the slots of one tube may be phase-shifted with respect to the slots of the other tube). Rotation of phase shift manipulator 25 applies torque to internal tube 12, thereby changing the amount of phase shift between the tubes or between the slots, and thereby causing a twisted or spiral shape to the distal tips of the tubes. The operation of tube manipulator 24 (e.g., to cause steering and bending of the distal tips) and the operation of phase shift manipulator 25 (e.g., to cause twisting torque) are independent of each other, thereby providing the surgeon with limitless possibilities of shaping the distal tips to any desired, three-dimensional shape.

Figure 3B:
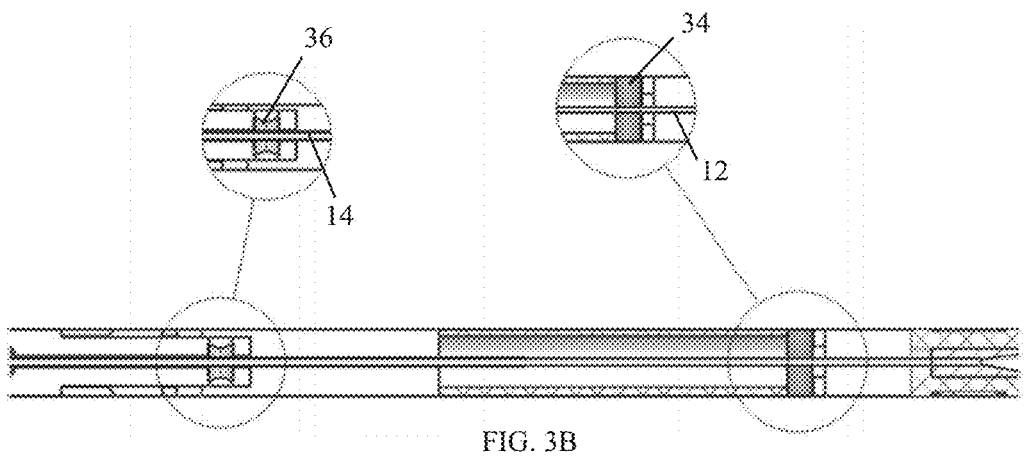
FIG. 3B is a more enlarged cutaway illustration of abutment elements mounted on the inner and outer tubes of the steering tool.
Figure 3C:
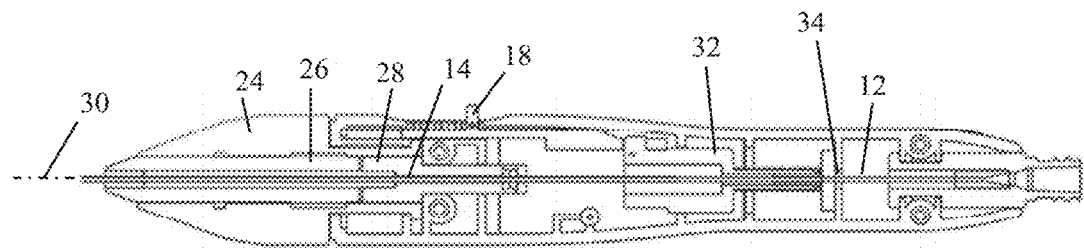
FIG. 3C is a simplified cutaway illustration of the steering tool handle, showing the control knob connected to a stopper which is movable towards the abutment element of one of the tubes for locking the tube.

Steering tool 10 includes a locking mechanism that switches between a locked position and an unlocked position, as will be explained with reference to FIG. 4A (and some of which is illustrated in FIG. 3C). In the locked position, the internal and external tubes 12 and 14 are locked at a particular longitudinal axial position relative to one another, and in the unlocked position there is uninhibited free movement of the internal and external tubes 12 and 14 relative to one another. The locking mechanism includes an adjustment assembly that creates an intermediate locked position in which there is partially inhibited movement of the internal and external tubes 12 and 14 relative to one another.

The locking mechanism includes the control knob 18 which is connected to a stopper 32, and an abutment element 34 mounted on the inner tube 12. As seen in FIG. 3B, another abutment element 36 is mounted on the outer tube 14. Additionally or alternatively, another stopper (or stopper 32) could move towards abutment element 36.

The adjustment assembly includes a biasing device 38 that applies a biasing force on the internal tube 12 and/or external tube 14 that at least partially inhibits movement of internal and external tubes 12 and 14 relative to one another. The biasing device 38 may be, without limitation, a coil spring, leaf spring, or wire or band whose tensile state is changeable (e.g., a nitinol wire or band). In the illustrated embodiment, the biasing device 38 is a coil spring positioned between stopper 32 and abutment element 34 (or more specifically one or more washers 35 placed in front of abutment element 34).

In the locked position, biasing device 38 applies a first biasing force against abutment element 34 sufficient to completely inhibit movement of internal and external tubes 12 and 14 relative to one another. This biasing force is created by moving the control button 18 sufficiently backwards in channel 20 (FIG. 2C). In the intermediate locked position, biasing device 18 applies a second biasing force (weaker than the first biasing force) against abutment element 34 to partially inhibit movement of internal and external tubes 12 and 14 relative to one another. This weaker biasing force is created by moving the control button 18 less backwards in channel 20 (FIG. 2C).

In the case of a rotary control knob, without limitation, the control knob may include a rotatable cam or winding spool that stretches or relaxes the biasing device to adjust the biasing force.

Figure 4A:
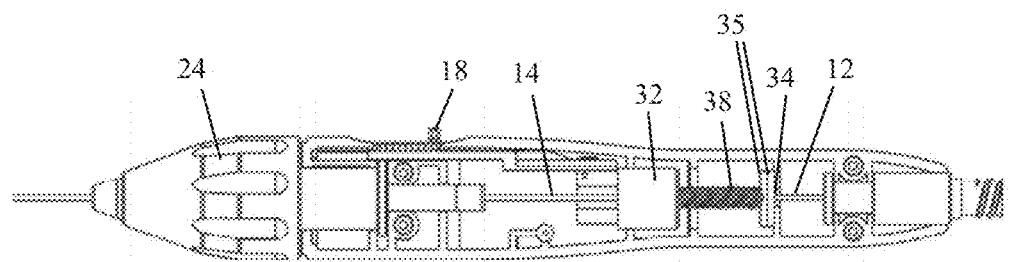
FIGS. 4A and 4B are simplified cutaway illustrations of the steering tool, showing a biasing device mounted between the stopper and the abutment element, wherein the biasing device is in a fully compressed position and the tubes are completely locked.
Figure 4B:
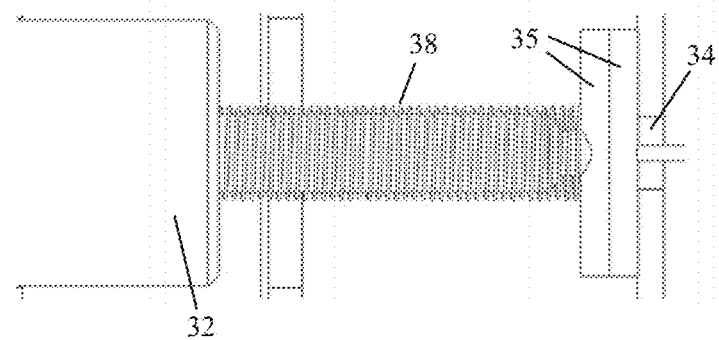

As seen in FIGS. 4A and 4B, in the locked position, biasing device 38 is in a fully compressed position and the tubes are completely locked.

Figure 5A:
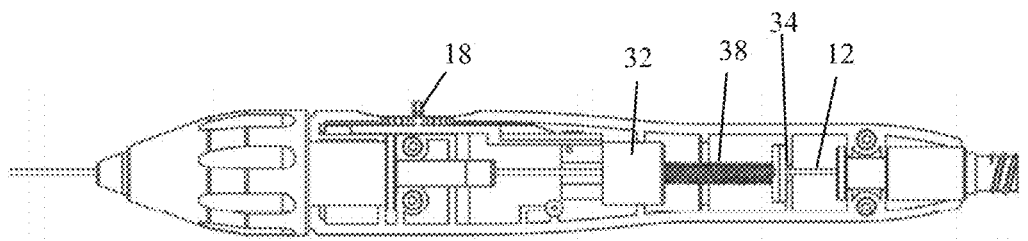
FIGS. 5A and 5B are simplified cutaway illustrations of the steering tool, showing the biasing device in a partially compressed position and the tubes are partially locked.
Figure 5B:
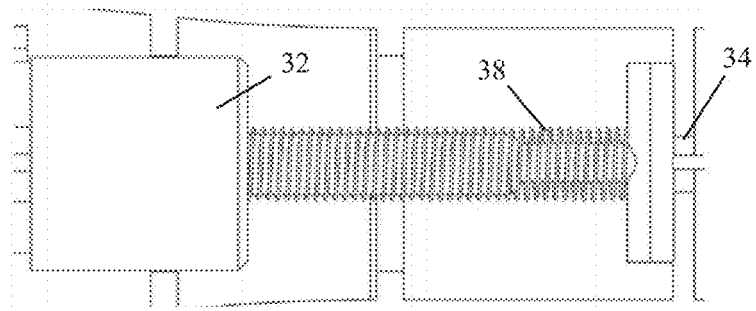

As seen in FIGS. 5A and 5B, in the intermediate locked position, biasing device 38 is in a partially compressed position and the tubes are partially locked.

In the locked position, distal portions of the internal and external tubes are in a fixed deformed orientation, and in the intermediate locked, the distal portions of the internal and external tubes are in a changeable deformed orientation. In the unlocked position, in which control button 18 is moved to the distal end of channel 20 (FIG. 2C), there is free movement of both tubes. Thus, during insertion of the steering tool 10 into the body lumen, the unlocked position may be used so that both tubes can move freely and allow the steering tool to bend in accordance with the shape of the body lumen (such as any kind of curved path). After reaching the desired destination in the body lumen, the handle is partially or fully locked for no more bending. Thus, the steering tool can be used very easily as a guide wire for guiding catheters and other devices.

Figure 6A:
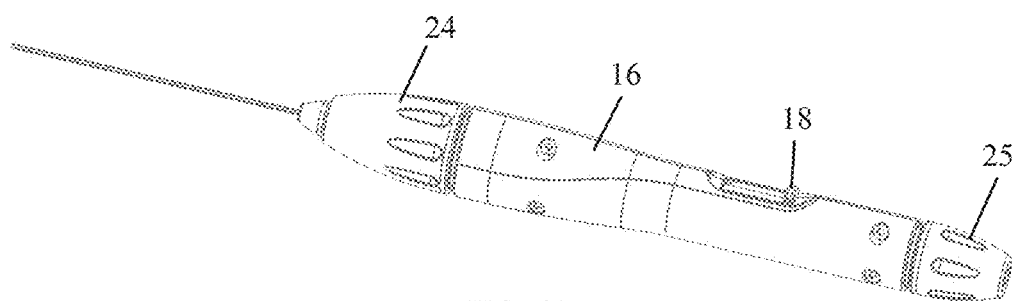
FIGS. 6A and 6B are simplified illustration of a steering tool, in accordance with another non-limiting embodiment of the present invention.
Figure 6B:
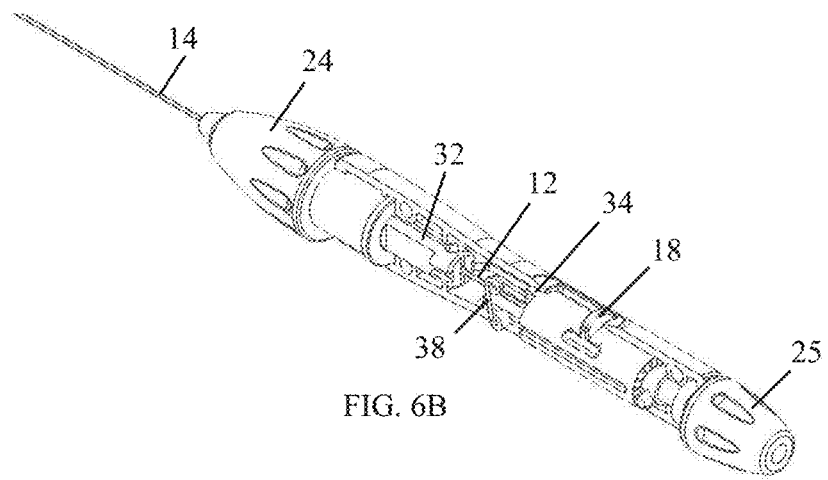

FIGS. 6A and 6B illustrate another version of the steering tool described above, with like numerals designating like elements. This embodiment differs from the previous embodiment in the placement of the control knob and type of biasing device used for the adjustment assembly.

What is claimed is:

1. A steering tool comprising:
   an internal tube disposed inside an external tube, proximal ends of said internal and external tubes being arranged for longitudinal axial movement relative to one another, wherein a distal end of said internal tube is fixedly joined to a distal end of said external tube;
   a tube manipulator operative to cause relative axial movement of said proximal ends of said internal and external tubes and bending of a distal portion of at least one of said internal and external tubes;
   a control knob connected to a stopper which is movable by said control knob towards or away from an abutment element mounted on at least one of said tubes, and wherein said control knob is selectively lockable at a plurality of locked positions; and
   a biasing device positioned between said stopper and said abutment element and configured to apply a variable biasing force on said abutment element, wherein a magnitude of said variable biasing force is determined by a position of said stopper, the position of said stopper being determined by which of said plurality of locked positions said control knob is locked thereat, and
   wherein in a first position of said locked positions of said control knob, said biasing device is at a fully biased position in which it applies a sufficiently strong biasing force on said abutment element to completely inhibit movement of said proximal ends of said internal and external tubes relative to one another, and in a second position of said locked positions of said control knob, said biasing device is at a partially biased position in which it applies a relatively weak biasing force on said abutment element to partially inhibit movement of said proximal ends of said internal and external tubes relative to one another.

2. The steering tool according to claim 1, wherein said control knob is slidable in a channel and said control knob is selectively lockable at the plurality of locked positions by means of teeth which are engageable with ridges.

3. The steering tool according to claim 1, wherein in said first position of said locked positions, distal portions of said internal and external tubes are in a fixed deformed orientation, and in said second position of said locked positions, said distal portions of said internal and external tubes are in a changeable deformed orientation.

4. The steering tool according to claim 1, comprising a phase shift manipulator in engagement with said internal tube, wherein rotation of said phase shift manipulator applies torque to said internal tube.

5. The steering tool according to claim 4, wherein said tube manipulator and said phase shift manipulator operate independently of each other.

6. The steering tool according to claim 1, wherein said biasing device is collinear with or parallel to said internal and external tubes.

* * * * *